United States Patent [19]
Conley, Jr.

[11] Patent Number: 5,797,630
[45] Date of Patent: Aug. 25, 1998

[54] METHOD AND SYSTEM FOR GENERATING, STORING AND MANAGING RECORDS

[75] Inventor: Ralph F. Conley, Jr., Miamisburg, Ohio

[73] Assignee: Direct Business Technologies, Inc., Miamisburg, Ohio

[21] Appl. No.: 613,249

[22] Filed: Mar. 8, 1996

Related U.S. Application Data

[63] Continuation-in-part of Ser. No. 586,190, Jan. 16, 1996.

[51] Int. Cl.[6] .................. B65D 37/00; B42D 1/00
[52] U.S. Cl. .................. 281/15.1; 283/54; 283/62; 402/70; 402/73; 402/80 R; 229/67.1; 229/67.4
[58] Field of Search .................. 283/36–43, 54, 283/62; 281/2, 3.1, 5.8, 15.1; 402/60, 70, 73, 19, 80 R; 229/67.2, 67.3, 67.4, 72, 67.1

[56] References Cited

U.S. PATENT DOCUMENTS

| | | | |
|---|---|---|---|
| 703,203 | 6/1902 | Wade | 229/67.2 |
| 986,000 | 3/1911 | Hart | 229/72 |
| 2,631,589 | 3/1953 | Zalkind | 229/67.2 X |
| 3,839,809 | 10/1974 | Casas et al. | 281/31 |
| 3,885,726 | 5/1975 | Fridlund et al. | 229/67.2 |
| 4,519,629 | 5/1985 | Podosek | 281/31 X |
| 4,629,349 | 12/1986 | Pitts | 281/31 X |
| 4,893,745 | 1/1990 | Weber et al. | 229/67.2 |
| 5,025,979 | 6/1991 | Dellacroce | 229/67.2 |
| 5,042,841 | 8/1991 | Friedman | 281/31 X |
| 5,123,676 | 6/1992 | Donnelly et al. | 283/37 |
| 5,295,622 | 3/1994 | Lorber | 229/67.2 |
| 5,411,293 | 5/1995 | Monzyk | 281/31 |
| 5,593,086 | 1/1997 | Ho | 229/67.3 |
| 5,613,791 | 3/1997 | Medenica | 402/4 |
| 5,626,368 | 5/1997 | St. Romain | 281/29 |

*Primary Examiner*—Frances Han
*Attorney, Agent, or Firm*—Jacox, Meckstroth & Jenkins

[57] ABSTRACT

A method and system for generating, inventorying, storing and managing records and record forms is disclosed. The record management system and method utilizes a system record generator which generates a plurality of policies, record forms and the like in response to a questionnaire record. Customized record forms and policies are generated and stored in a unique record receiver having indicia for clearly identifying forms therein. A record holder is also provided for storing, inventorying, and managing the record forms used. The method and system are particularly useful for managing and insuring that record forms are completed for employees in a company by providing convenient means for visually identifying record forms, such as employment applications and the like, for ascertaining when one or more forms is missing by the presence of an empty compartment in the record holder. In another embodiment of the invention, a form management kit is provided having a folding member with a plurality of permanent record forms secured thereto. A receiving area for receiving either the permanent record forms or different, non-permanent, forms, papers or records relative to, for example, an employee is also provided on the same kit which can be folded up to a convenient storage size.

21 Claims, 11 Drawing Sheets

FIG. 2

| | | Keep | Delete |
|---|---|---|---|
| 1. Organization Chart Confusion and low productivity reign when employees don't know to whom they report or to whom they should report various actions or activities. An organization chart serves to streamline channels of communication. (If choosing to keep this policy remember to include your company's organization chart when returning the completed questionnaire.) | ... | ☐ | ☐ — 12 ← 14 |
| ... | ... | ... | ... |
| 4. Temporary Employees Defines a temporary employee. | | Keep ☐ — 16 | Delete ☐ — 17 |
| 5. "Non-Exempt" & "Exempt" Employees Defines non-exempt and exempt employees. | | Keep ☐ | Delete ☐ |
| 6. Anniversary Date Defines the first day of work as the employee's anniversary date. | | Keep ☐ — 30 | Delete ☐ |
| ... | ... | | |

FIG. 5

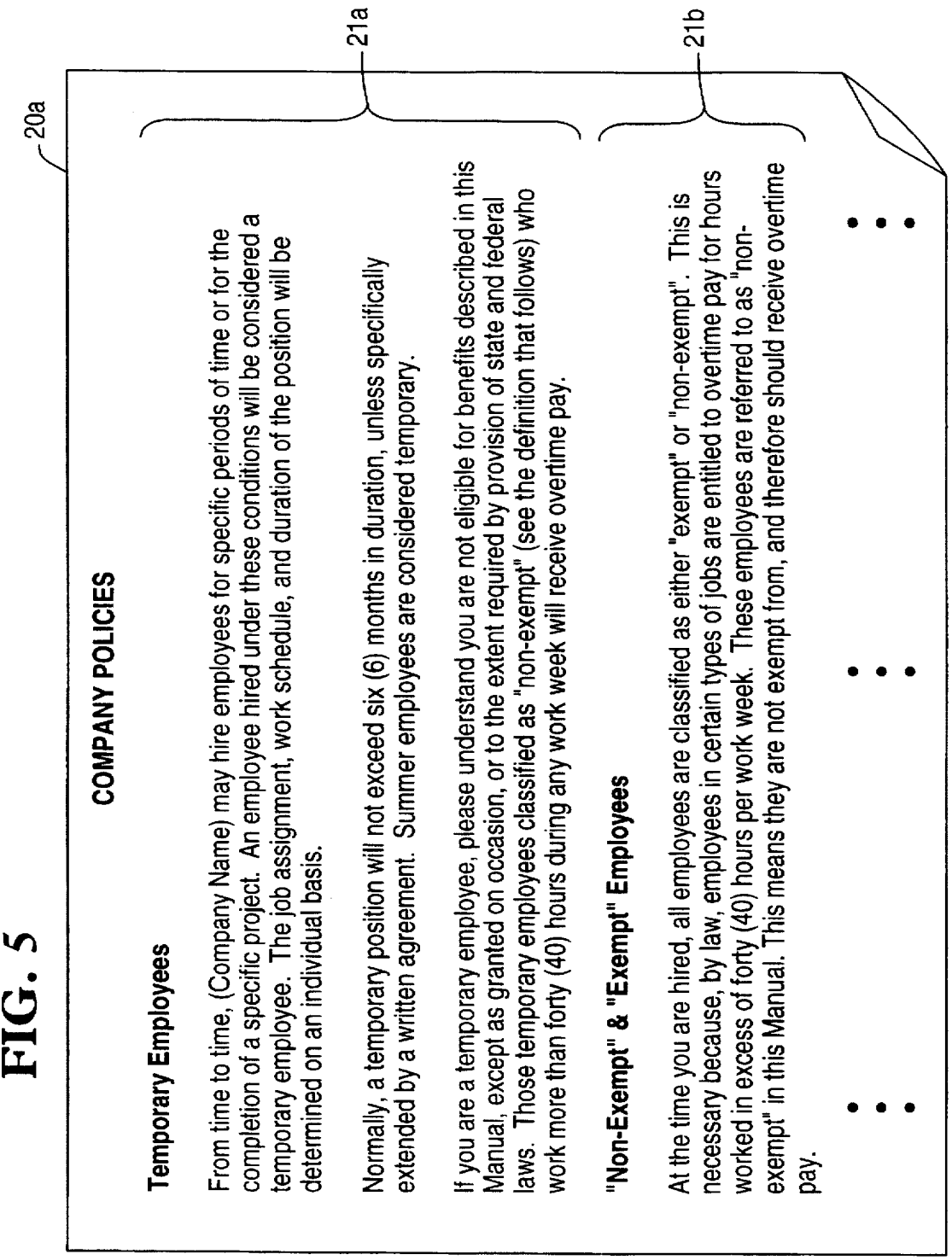

COMPANY POLICIES

Temporary Employees

From time to time, (Company Name) may hire employees for specific periods of time or for the completion of a specific project. An employee hired under these conditions will be considered a temporary employee. The job assignment, work schedule, and duration of the position will be determined on an individual basis.

Normally, a temporary position will not exceed six (6) months in duration, unless specifically extended by a written agreement. Summer employees are considered temporary.

If you are a temporary employee, please understand you are not eligible for benefits described in this Manual, except as granted on occasion, or to the extent required by provision of state and federal laws. Those temporary employees classified as "non-exempt" (see the definition that follows) who work more than forty (40) hours during any work week will receive overtime pay.

"Non-Exempt" & "Exempt" Employees

At the time you are hired, all employees are classified as either "exempt" or "non-exempt". This is necessary because, by law, employees in certain types of jobs are entitled to overtime pay for hours worked in excess of forty (40) hours per work week. These employees are referred to as "non-exempt" in this Manual. This means they are not exempt from, and therefore should receive overtime pay.

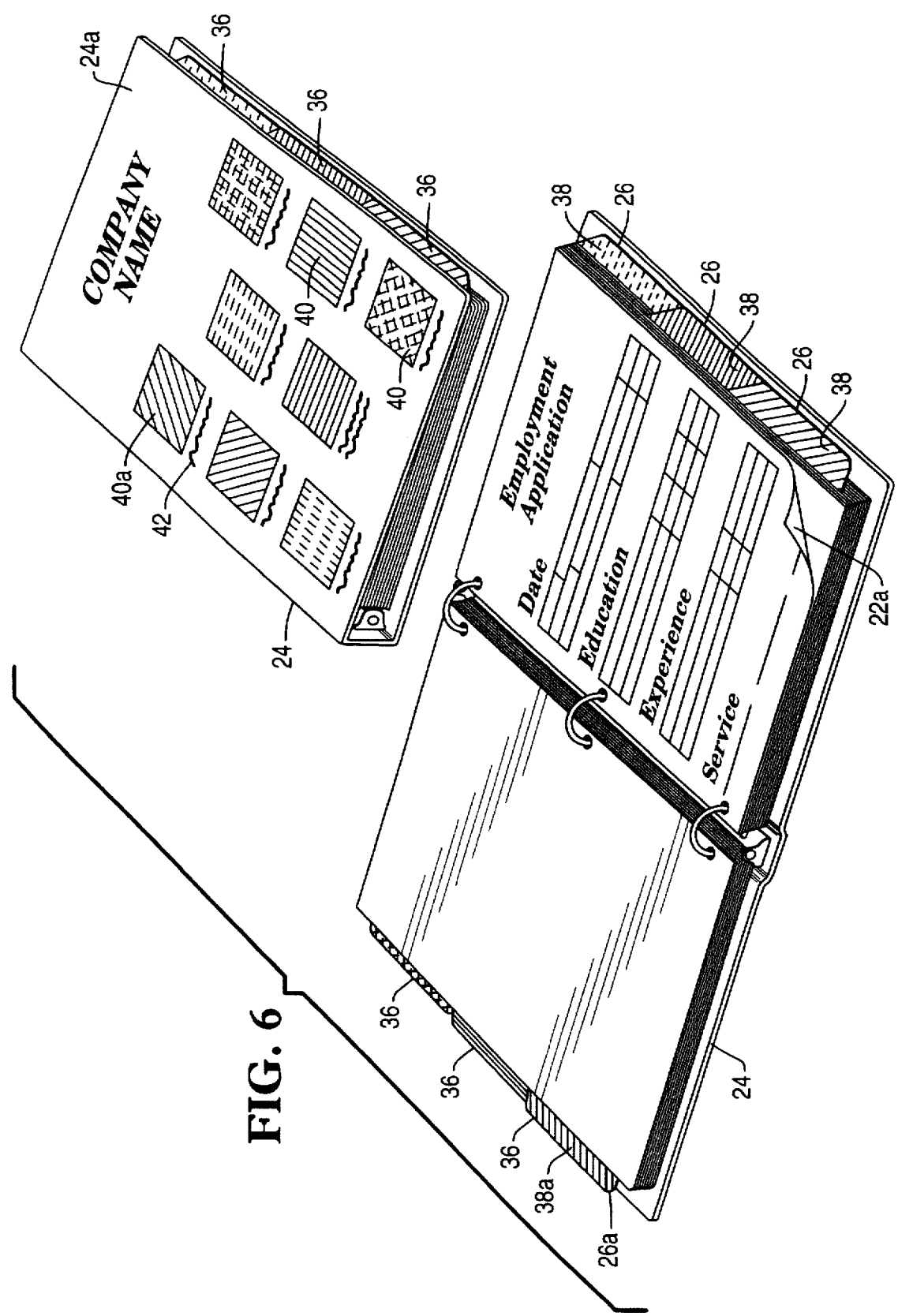

METHOD AND SYSTEM FOR GENERATING, STORING AND MANAGING RECORDS

CROSS-REFERENCE TO RELATED APPLICATION

This application is a continuation-in-part of pending application Ser. No. 08/586,190, filed Jan. 16, 1996.

BACKGROUND OF THE INVENTION

1. Field of the Invention

This invention relates to a record management system and method and, more particularly, to a system and method for generating customized policies, forms and for providing a record management system for receiving and storing both unused and used record forms.

2. Description of Related Art

In the past, many companies have spent considerable amounts of time, effort and money generating policies and appropriate forms for use in their business. It was not uncommon, for example, to have a single employee fill out numerous forms prior to, during and after employment with the company. Typically, the forms were not organized into a single record receiver. Also, after the forms were used, there was no convenient means for identifying the forms or for storing them for a single employee. For example, for a single employee of the company there would simply be a single folder with any forms associated with that employee simply being situated therein. Typically, there was no way of identifying which forms were in the folder. Also, the forms were not organized into any coherent or convenient order. Unfortunately, this sometimes resulted in forms which were required to be completed to be overlooked.

Prior art systems also failed to compile and/or store the forms in a convenient manner such that the forms could be properly inventoried, used and then stored in a self-contained system. This is particularly useful in environments where a plurality of forms are used over over again. For example, due to the high employee turnover in the fast food environment it was sometimes difficult to inventory, use and subsequently store the plurality of employment forms required for each individual employee, thereby making maintenance and management of the numerous employment forms cumbersome and time consuming.

What is needed, therefore, is a record management system and method which will conveniently generate the necessary forms, provide storage for the necessary forms prior to use and subsequently store the necessary forms into a convenient storage receiver.

SUMMARY OF THE INVENTION

It is, therefore, a primary object of this invention to provide a system and method for generating a plurality of policies, record forms and for providing a record management system and method for identifying and storing record forms before and after they are used.

Another object of the invention is to provide a portable form management kit which conveniently provides an inventory of permanent record forms and which also provides a receiving area for receiving either the permanent record forms or other forms, documents or records relative to, for example, an employee.

It is still another object of the invention to provide a portable single management kit that inventories and stores all forms required for a particular employee, for example.

It is also an object of this invention to provide a record management system which comprises storage means for storing record forms and also providing means for concealing some information, such as confidential information, while revealing other information, such as non-confidential information.

It is another object of this invention to provide a system and method for generating customized policies, forms, storage and retrieval devices for such customized forms.

In one aspect, this invention comprises a record holder consisting of a container comprising a plurality of compartments, a first indicia associated with one of the plurality of compartments, a second indicia associated with another of the plurality of compartments, a cover secured to the container for closing said plurality of compartments such that the first indicia is visible while the second indicia is concealed.

In another aspect, this invention comprises a file management system consisting of storage means for storing an inventory of a plurality of forms into a predetermined order, where the storage means comprises a plurality of separators for separating the plurality of forms, a first plurality of indicia associated with the plurality of separators, respectively form holder means for holding some of the plurality of forms, the form holder means comprising a second plurality of separators for separating the some of the plurality of forms, and a second plurality of indicia associated with the second plurality of separators, wherein the second plurality of indicia correspond to the first plurality of indicia.

In still another aspect of this invention, this invention comprises a method for filing a plurality of forms in a form management system, storing an inventory of the plurality of forms in a first storage container, the first storage container comprising a plurality of compartments separated by a plurality of compartment separators, respectively, each of the plurality of compartment separators comprising at least one first indicia, using at least one of the plurality of forms; and storing the at least one of the plurality of forms used during the using step in a second storage container comprising a second plurality of compartments separated by a second plurality of compartment separators, each of the second plurality of compartment separators comprising at least one second indicia which generally corresponds to the first indicia.

In yet another aspect of this invention, this invention comprises a form management system and method consisting of a plurality of kits each comprising a plurality of forms, at least one of the plurality of kits comprising a form identifier associated therewith, a storage device for organizing the plurality of forms into separate storage device compartments, at least one of the storage device compartments comprising a second form identifier associated therewith, a record holder for organizing the plurality of forms into separate form holder compartments, at least one of the record holder compartments comprising a third form identifier associated therewith, the form identifier, the second form identifier and the third form identifier comprising at least one common characteristic.

In yet another aspect of this invention, this invention comprises a method for managing records comprising the steps of generating a plurality of management forms, situating the plurality of management forms into a record receiver having an identifier for identifying at least one of the plurality of management forms, using the at least one of the plurality of management forms, organizing those of the plurality of management forms utilized in the using step into a predetermined order in a record holder.

And still another aspect of the invention is a file management system comprising of a record holder comprising a plurality of record members detachably secured thereto; and a cover secured to said record holder; said cover comprising at least one flap which defines a pocket for receiving a second record member when said plurality of record members are moved from an open position to a closed position.

In another aspect of the invention is a record maintenance system comprising a permanent record set and a non-permanent record set, said system comprising of a permanent record area having said permanent record set secured thereto; a removable record area for removably receiving said non-permanent record set; a pocket flap secured to said foldable member and being foldable from an open position to a closed position such that when said pocket flap is in said closed position said permanent record area may be moved to a second fold position, thereby defining said removable record area.

In still another aspect of the invention is a method for managing a permanent record set and a non-permanent record set, said method comprising the steps of situating said permanent record set on an end of a folding member; situating at least one flap on said folding member such that when said at least one flap and said permanent record set are moved to a closed position, a pocket is defined for receiving said non-permanent record set.

In yet another aspect of the invention is a form management kit comprising of a folding member having a pocket for receiving a plurality of non-permanent record forms; a plurality of permanent record forms secured to a permanent record area of said folding member; said folding member being foldable along a plurality of fold lines such that said plurality of permanent and non-permanent record forms are stored.

These and other objects and advantages of the invention will be apparent from the following description, the accompanying drawings and the appended claims.

BRIEF DESCRIPTION OF THE ACCOMPANYING DRAWINGS

FIG. 2 is a view of a questionnaire record for use in the present invention;

FIG. 5 is a portion of a policy situated in the policy manual shown in FIG. 3 showing a policy generated in response to a question on the manual questionnaire record of FIG. 2;

FIG. 6 is a view of a record receiver in a closed and an open position;

DETAILED DESCRIPTION OF THE INVENTION

Figure 1:
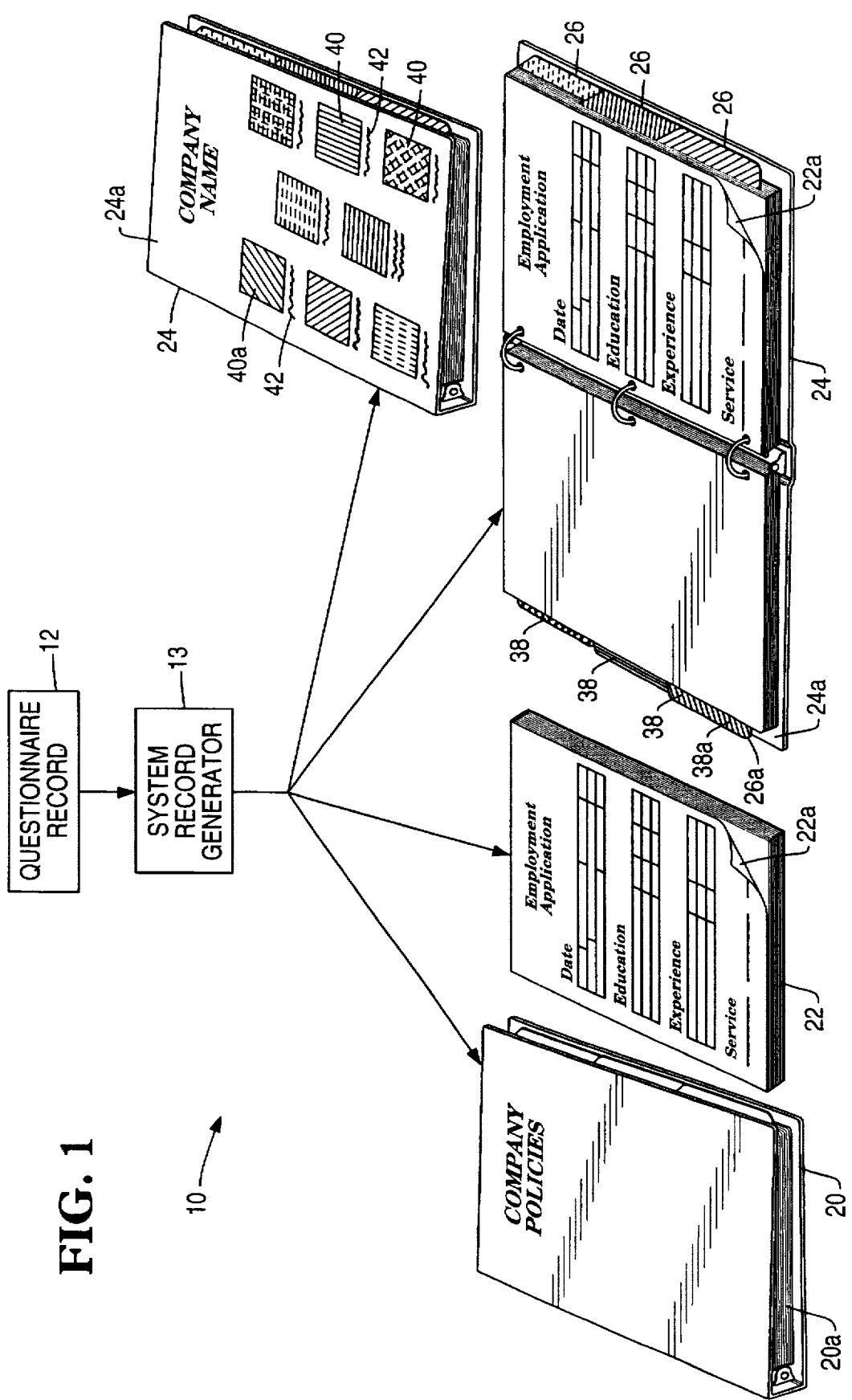
FIG. 1 is a view showing a system for generating company policies, record forms and a record receiver.

Referring now to FIG. 1, a system for generating and managing a plurality of policies and records is shown. The system comprises a questionnaire record 12. As best illustrated in FIG. 2, the questionnaire record 12 comprises a plurality of record information areas 14 which provide a plurality of questions to elicit various customized information. In the embodiment being described, the customized information relates to company policies (such as personnel, property, health, safety and the like) and employment information, but it should be appreciated that the customized information could relate to other areas as well. For example, question No. 4 on questionnaire record 12 asks the user of the questionnaire record 12 a question regarding whether it desires to have a policy regarding temporary employees, in which case the user would check the "keep" box 16. Identifying a "keep" box 16 provides means for identifying those policies and/or provisions which the user wishes to include as part of its corporate policies. If a policy is not desired, then the user would mark the "delete" box 17.

After all the questions on the questionnaire record 12 have been completed, a system record generator 18 (FIG. 1) generates a customized policy set 20, at least one customized record form set 22 comprised of a plurality of record forms 22a and a customized record receiver 24 for receiving a plurality of customized record forms 22a.

The customized policy set 20 comprises a plurality of policy sheets 20a (FIG. 5) comprising a plurality of policies, such as policies 21a and 21b, which are generated in response to the information on the questionnaire record 12. For example, after the user indicates that it was desirous of keeping a policy for defining a temporary employee by checking the keep box 16 (FIG. 2) on questionnaire record 12, then a corresponding customized policy 21a (FIG. 5) is generated by the system record generator 18.

Figure 11:
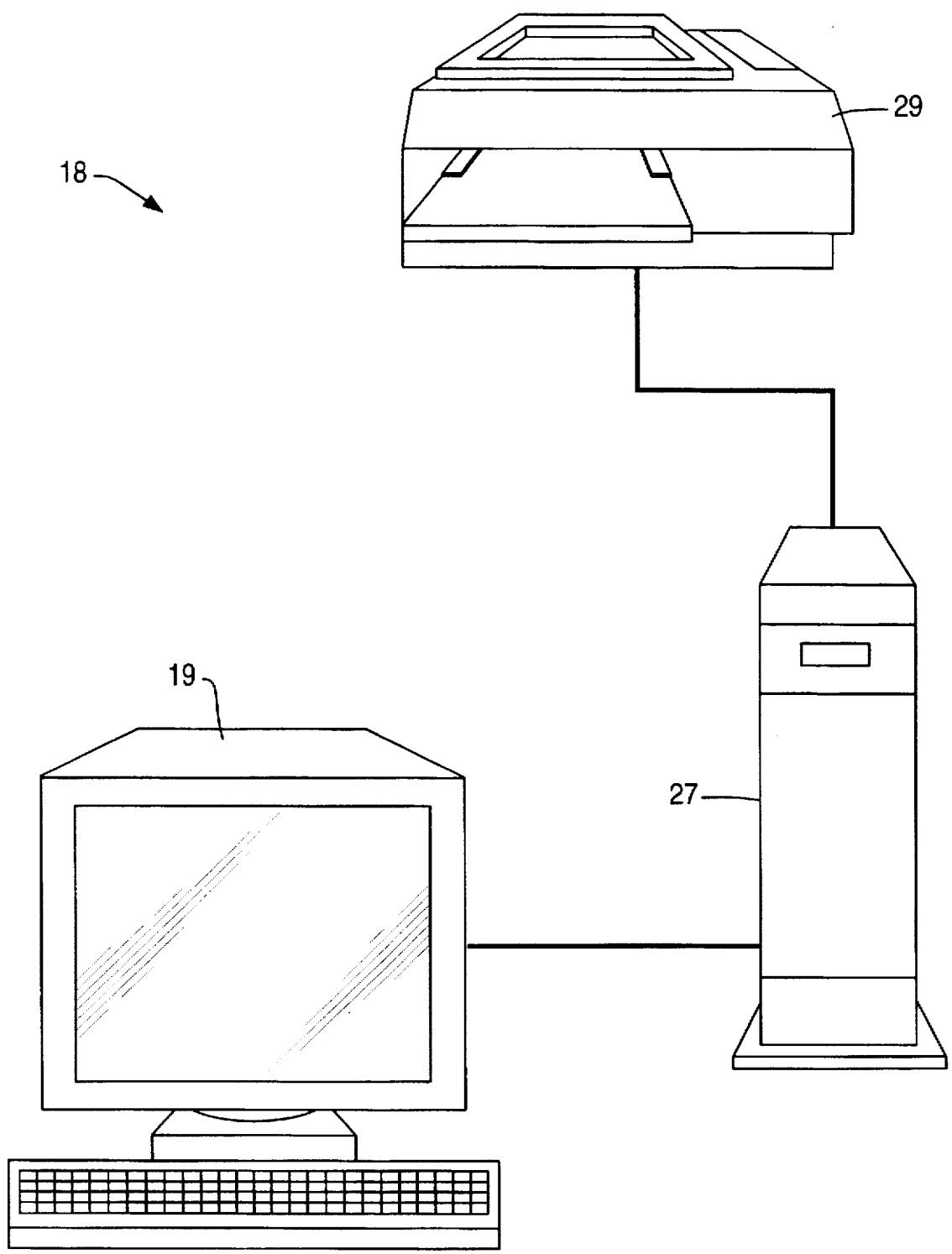
FIG. 11 shows a system record generator in accordance with one embodiment of the invention.

FIG. 11 illustrates components comprising the system record generator 18 in accordance with one embodiment of the invention. The system record generator 18 comprises a work station 19 which is coupled to a server 27 which, in turn, is coupled to a laser printer 29. In the embodiment being described the work station 19 may comprise an IBM compatible PC having a Windows NT™ or Windows 95™ operating system which are available from Microsoft Corporation. Suitable software, such as Microsoft Word™, which is also available from Microsoft Corporation, may be used to generate the various record forms 22a and policies 21a and 21b and the like.

The server 21 may comprise an IBM compatible PC which is also running a Windows NT server operating system available from Microsoft Corporation. The printer 23 may comprise a laser printer available from Hewlett Packard or any suitable device for printing the form set 22, record receiver 24 and various record forms 22a and policies 21a and 21b.

In the embodiment being described, a software template created in the Microsoft Word™ program may be stored in the server 27 and accessed by the work station 19. When a questionnaire record 12 is received, the template is accessed and opened using work station 19. Using various macros provided in Microsoft Word™, a color coding feature and basic Microsoft Word™ editing features, the template is adjusted to reflect the responses given in the completed questionnaire record 12. The template is then re-named and stored as a new and unique document on server 27. The document is thereafter printed in response to a print command sent from work station 19 to server 27 which then causes the laser printer 29 to print the document. Also, although not shown, the system record generator 18 may comprise a tape back-up for backing up information stored on the server 27.

Thus, it should be appreciated that system 10 provides means for generating the customized policy 20 comprising a plurality of policies 21a and 21b in response to the questionnaire record 12.

Figure 3:
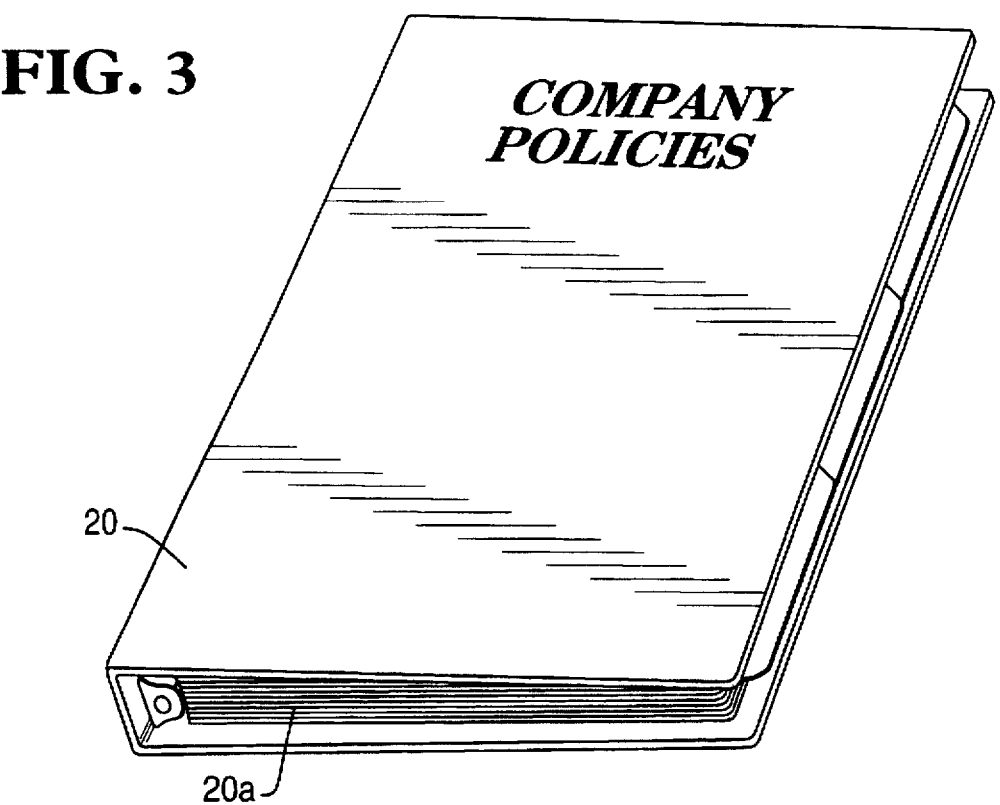
FIG. 3 is a view of a policy manual generated by a system record generator in response to the manual questionnaire record shown in FIG. 2.
Figure 4:
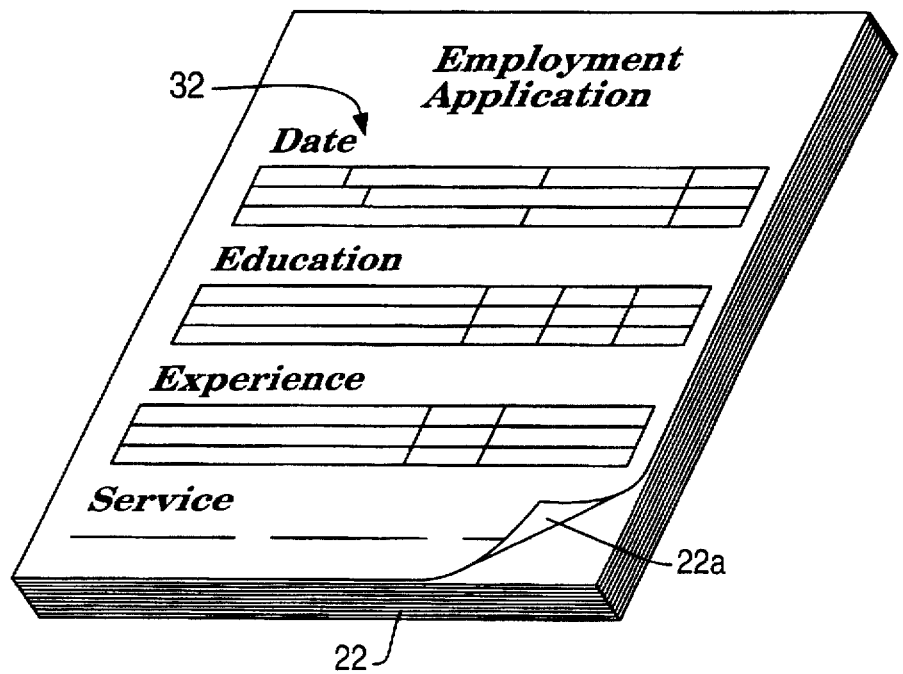
FIG. 4 is a kit or compilation of record forms generated by the system generator shown in FIG. 1.

After all questions on the record 12 have been completed and the customized policy set 20 (FIG. 3) is generated, then system record generator 18 may generate the plurality of record forms 22a comprising the customized record form set 22 (FIG. 4) in response to the questionnaire record 12. For example, if the user checks the "keep" box 30 (FIG. 2) corresponding to a question 6 regarding an employee's anniversary date, then not only would a corresponding policy be generated for the customized policy set 20, but a customized record from 22a, like the employment application 22a in FIG. 4, may be generated to have a corresponding area (such as area 32 in FIG. 4), for identifying the employee's anniversary date.

Thus, it should be appreciated that the system record generator 18 utilizes the questionnaire record 12 to generate a customized record form set 22. It should also be appreciated that the questionnaire record 12 may provide a listing (not shown) of all available forms from which the user may choose. The chosen forms may then be compiled and bound together to provide the customized record form set 22.

In the embodiment being described, each customized record form set 22 may be provided to provide a plurality of one type of form, such as an employment application; an absent, vacation, leave and warnings form; accident and injury form; termination form; COBRA form; insurance forms; safety forms; employment agreements; government forms and the like. Alternatively, a "kit" of forms, such as employment-related forms, may be provided. Note that the forms may be bound or stapled together as desired.

Once the customized policy set 20 and customized record from set 22 are generated, then various record forms 22a from a plurality of sets 22 (FIG. 4) may be assembled or compiled into a storage means, storage organizer or record receiver 24 (FIG. 6). In the embodiment being described, the record receiver 24 may comprise a binder or other suitable storage device. In this embodiment, the record receiver 24 comprises a cover 24a comprising a plurality of separators 26 for separating the various record forms 22a into a plurality of different compartments defined by the area between adjacent separators.

Notice that a plurality of indicia 40 (FIG. 1) are situated on cover 24a and correspond to indicia 38 used on the plurality of separators 36. For example, cover 24a may comprise indicia 38a (FIG. 6) which corresponds to indicia 40a on separator 26a.

The cover 24a may also comprise information 42 associated with each indicia 38a to facilitate correlating indicia 38a corresponding to a particular customized record form 22a, such as the employment application 22a.

Advantageously, the system and method of the present invention provides means for quickly organizing, inventorying, and identifying various customized record forms 22a, such as the employment application shown in FIG. 6, for easy use and referral. The record form receiver 24 may comprise any type desired customized record form 22a, and it should be appreciated that the indicia 38 and 40 could be any suitable means for identifying the separated forms. For example, the indicia 38 and 40 could comprise a plurality of colors, shades, art work or the like as may facilitate making the various separators 36 and corresponding customized record forms 22a easy to identify.

Figure 7:
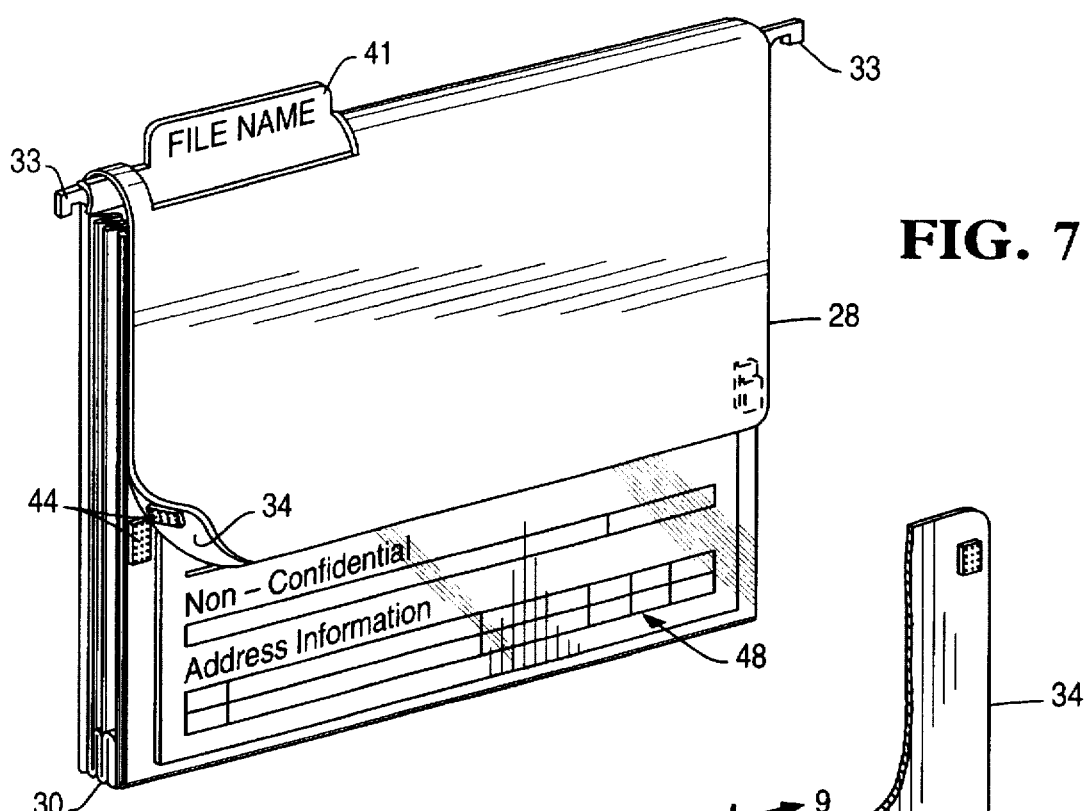
FIG. 7 is a view of a record holder shown with a cover in a closed position.
Figure 8:
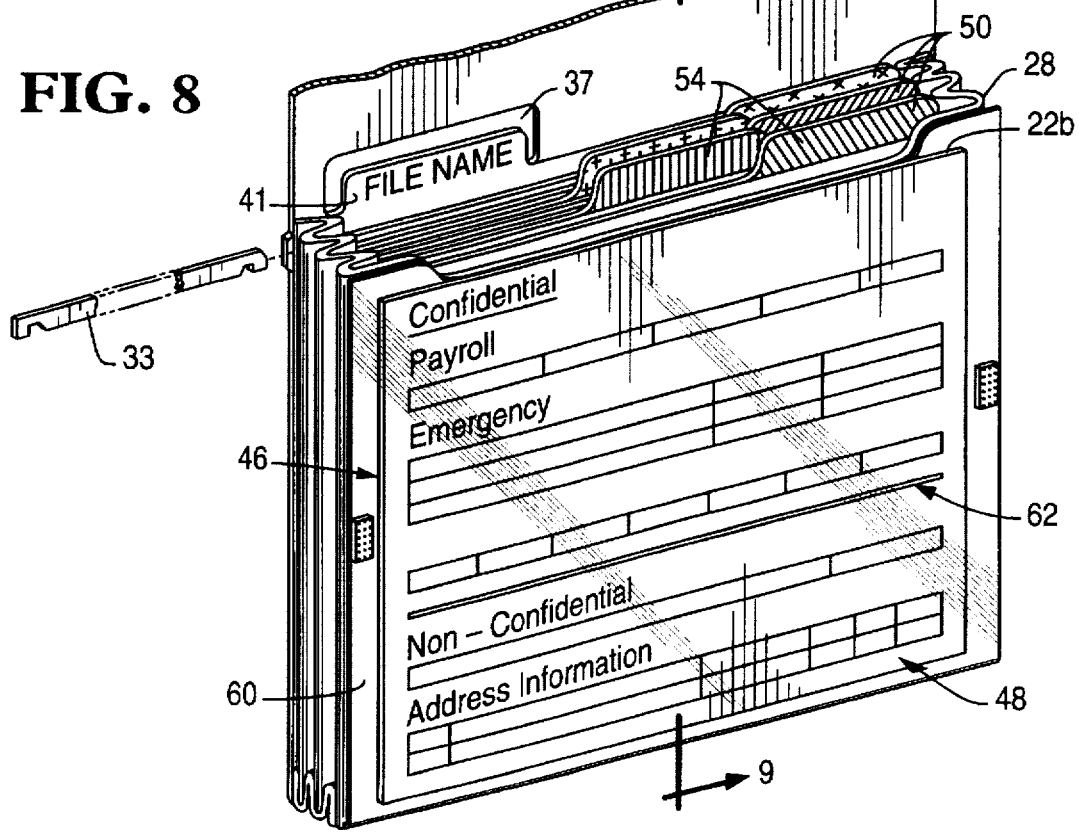
FIG. 8 is another view of the record holder shown in FIG. 7 showing the cover in an open position.
Figure 9:
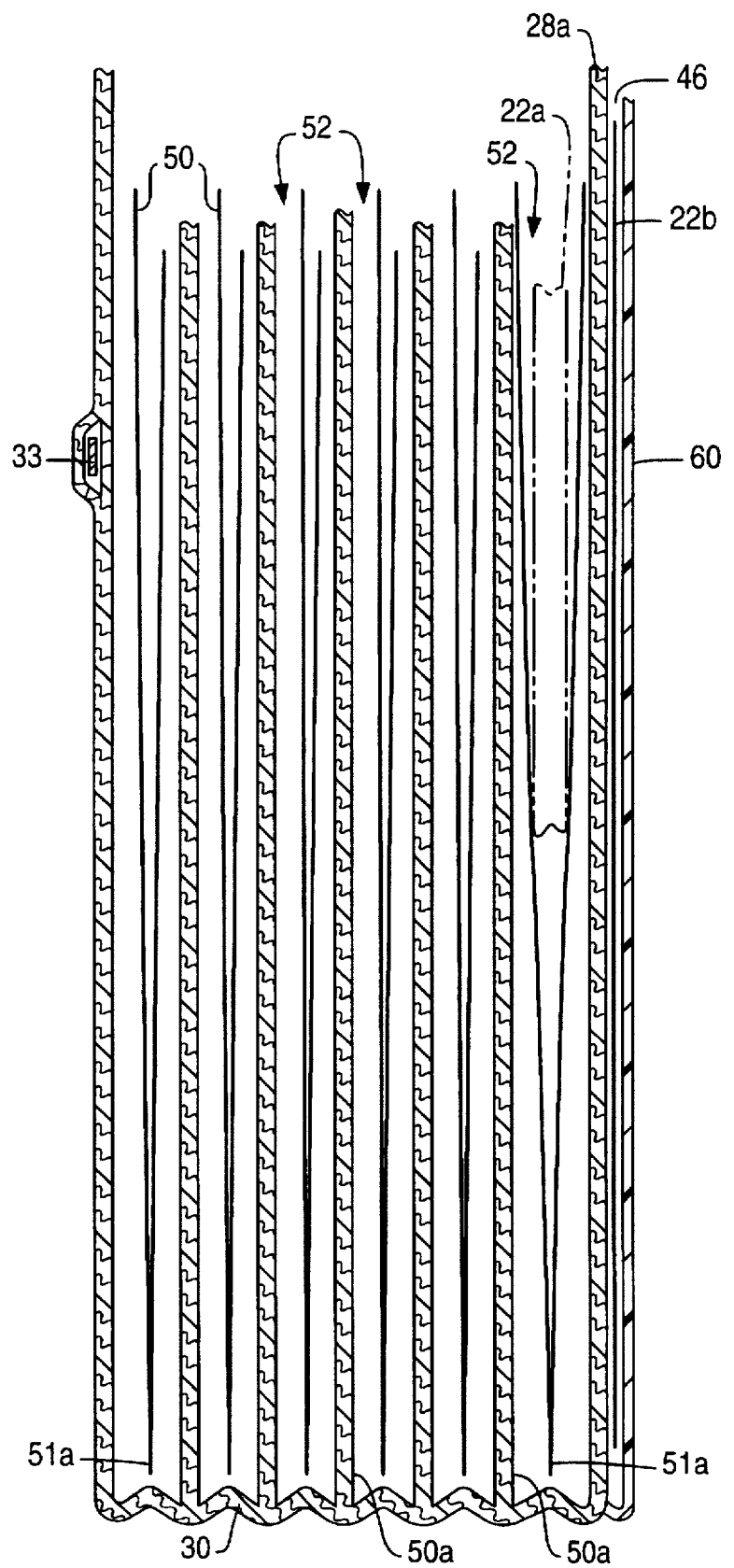
FIG. 9 is a cross-sectional view of the record holder shown in FIGS. 7 and 8.

Referring now to FIGS. 7–9, a record holder 28 is shown comprising a container 30 having a plurality of record form receiving areas 52 (FIG. 9). As best illustrated in FIG. 8, the container 30 also comprises a support 33 for supporting the record holder 28, for example, in a drawer (not shown) or file cabinet (not shown). The container 30 further comprises a cover 34 secured or integrally formed as part of the container 30. Notice that cover 34 further comprises an aperture 37 which facilitates revealing an indicia or identifier 41 when the cover 34 is in a closed position, as illustrated in FIG. 7.

Notice in FIG. 8 that the record holder 28 further comprises a plurality of separators 50 having indicia 54 thereon. In the embodiment being described, the indicia 54 correspond to the indicia 38 and 40 described above relative to the record receiver 24 (FIG. 6).

In the embodiment being described, the separators 50 may comprise separate wall dividers (such as walls 50a in FIG. 9) having the indicia 54 situated thereon. Alternatively, separators 50 may include separate removable folders 51a (as viewed in FIG. 9) or other means for separating the customized record forms 22a so that they are suitable for receiving and storing at least one of the record forms 22a. Notice that the indicia 54 (FIG. 8) correspond directly to the indicia 38 and 40 shown in FIG. 6 which provides means for easily identifying the record forms 22a prior to their use and also after they are used and stored in record holder 28. This facilitates providing a convenient form inventory and management system for keeping track of, accounting for, and managing the numerous record forms 22a that are used in a business. The indicia 54 may comprise color, marking, lettering, graphics and the like, as with the indicia 38 and 40. In the embodiment being described, the folders 51a themselves may be colored to provide or define the indicia 54.

The record holder 28 further comprises locking means or a lock 44 (FIG. 7) which, in the embodiment being described, may be VELCRO™, a string tie arrangement (not shown) or any suitable means for securing cover 34 in the closed position shown in FIG. 7.

The system and method of the present invention also comprises security means for concealing certain information, such as confidential information 46 (FIG. 8) while revealing non-confidential information, such as information 48. As best illustrated in FIGS. 8 and 9, the record holder 28 comprises a transparent sheet or cover 60 (FIG. 9) which cooperates with a wall 28a of record holder 28 to define a compartment 46 (FIG. 9) for receiving and storing a customized record form b. As best illustrated in FIG. 8, record form b comprises a confidential area 46, defined by the area above line 62, and a non-confidential area 48 defined by the area below line 62 (as viewed in FIG. 8). As illustrated in FIG. 7, when cover 34 is in the closed position shown in FIG. 7, the confidential information area 46 is covered, thereby concealing any information in the confidential area 46 of the record form b. Simultaneously, any information in the non-confidential area 48 is revealed.

It should be appreciated that the record holder 28 may be comprised of one receiving area 52 which is capable of receiving the plurality of record forms 22a and/or reusable folders in which the plurality of record forms 22a are situated.

It has been found that the record holder 28 is particularly suitable for use in an employment environment where it is important to maintain the confidentiality of some information, such as employment review information, payroll and wage information and the like, while revealing other non-confidential information, such as an employee's name and address. One method for utilizing the features of the present invention will now be described with respect to FIG. 10.

The method starts by completing the questionnaire record 12 (FIG. 1) at block 90. At decision block 92 (FIG. 10), it is determined whether or not the questionnaire record 12 is complete. If it is not, then the method loops back to block 90 as shown. If it is, then the method proceeds to block 94 where the customized policy 20 (FIG. 1) is generated by the system record generator 18 in a manner described earlier herein.

Figure 10:
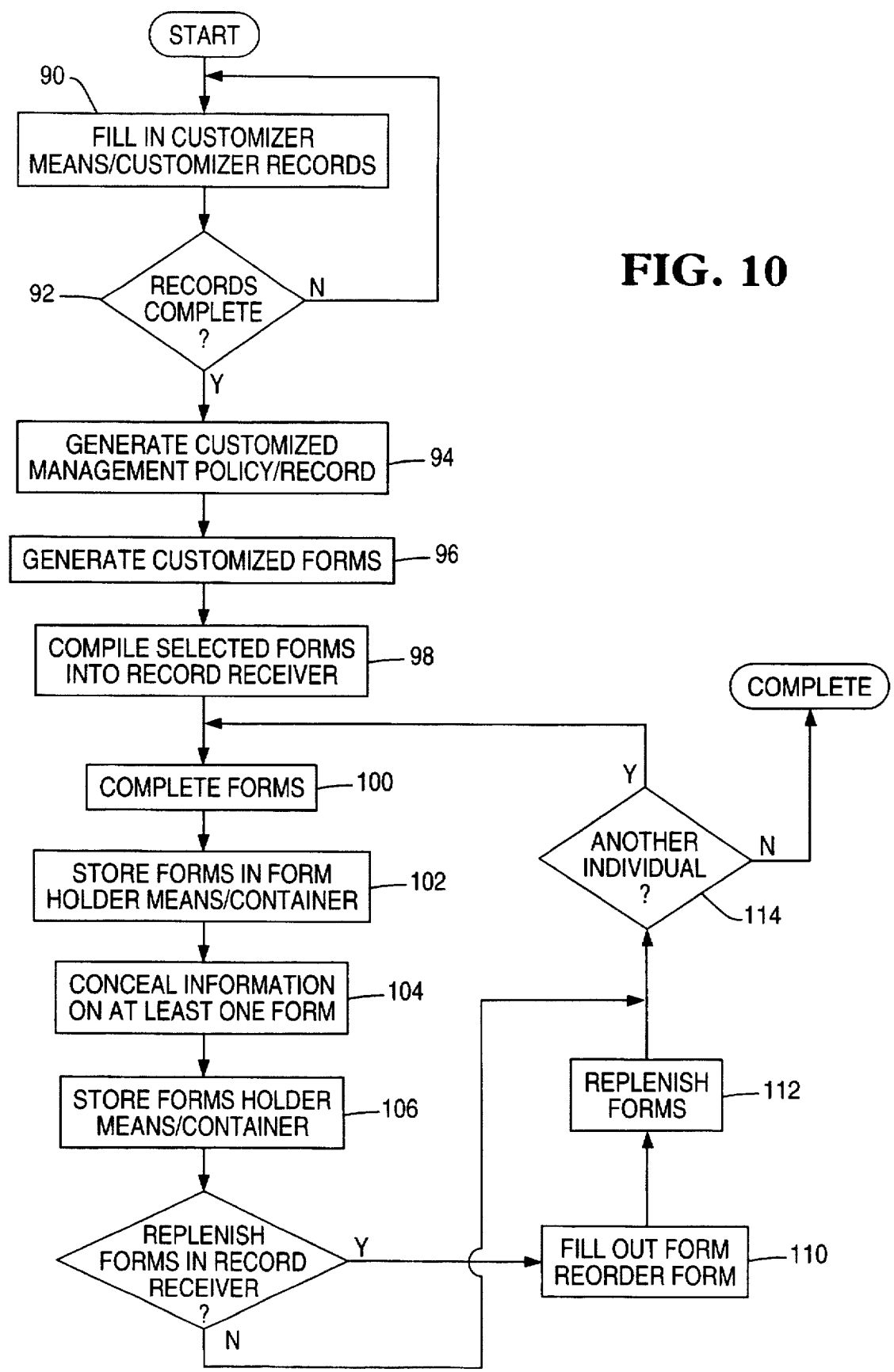
FIG. 10 is a schematic view of a method process of the present invention.

The system record generator 18 generates the customized record set 22 at block 96 (FIG. 10). Selected customized record forms 22a from one or more sets are then compiled into the record receiver 24 (block 98 in FIG. 10).

Throughout the normal course of business, the record forms 22a may be removed from the record receiver 24 and completed (block 100) and, thereafter, stored in the record holder 29 (block 102).

When the cover 34 on container 30 is secured in the closed position, the confidential information area 46 on record form 22b may then be concealed (block 104).

At block 106, the record holder 28 may then be stored in any suitable storage, such as a file cabinet. At decision block 108, it is determined whether any of the record forms 22 utilized in the record receiver 24 need to be replenished. If they do, then a reorder form (not shown) may be situated in the record receiver 24 such that a user may easily reorder any missing forms 22 from a form supplier (not shown). In this regard, the user would fill out the reorder form (block 110 in FIG. 10) and send it to the supplier. At block 112, a replenishment supply of forms 22a is supplied for storing in and replenishing of the record receiver 24.

It should be appreciated that the record receiver 24 may provide or store a plurality of identical record forms 22 for use by multiple individuals. The record holder 28 shown in FIGS. 7–9 is suitable for retaining all record forms 22 associated, for example, with a single individual or entity. At decision block 114, it is determined whether record forms 22 for another individual need to be completed. If they do, then the method loops back to block 100 as shown. If they do not, then the process is complete. Notice that if the decision at decision 108 is negative, then the process loops to decision block 114 as shown.

Advantageously, this method and system provide means for generating customized policies and forms for use, for example, in a business. The system and method also provide means for collecting, inventorying and compiling the forms and subsequently storing the forms after their use. Further, the system and method provides means for easily identifying and separating the forms into convenient compartments and for ultimately storing the forms into coded areas after they are used so they can be easily identified by the user.

Figure 12:
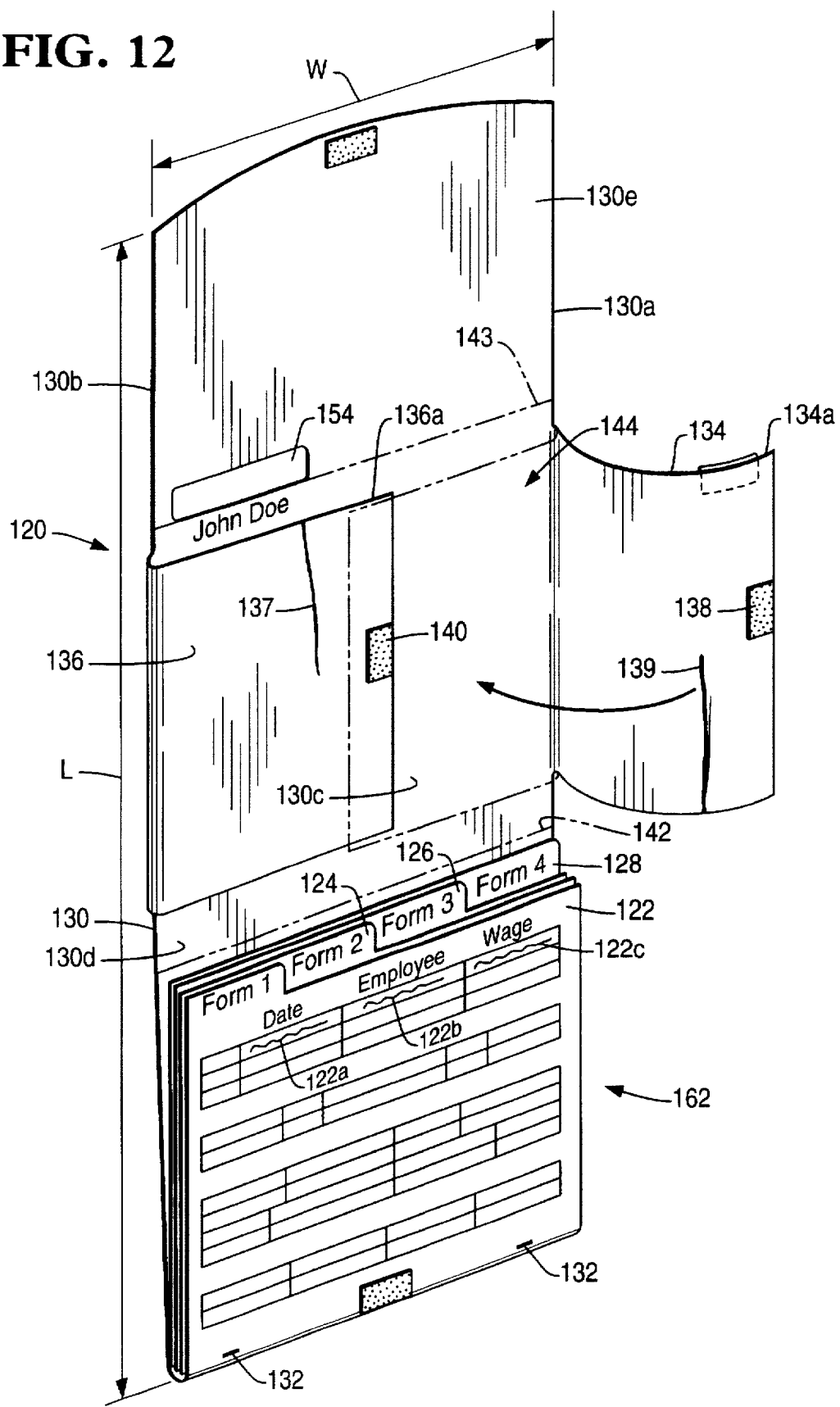
FIG. 12 shows a portable file management system in accordance with another embodiment of the invention.
Figure 13:
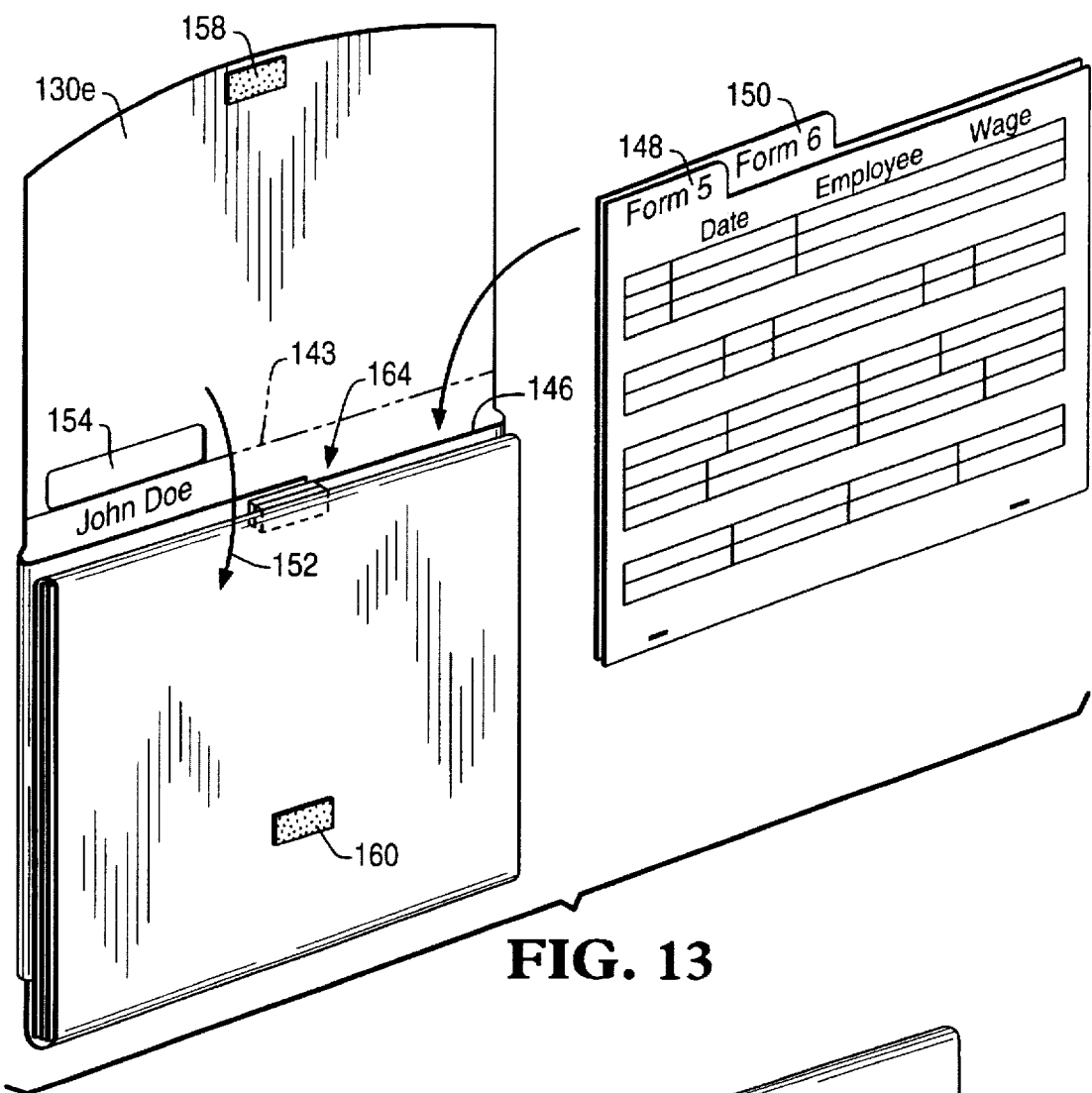
FIG. 13 is a view of the file management system shown in FIG. 12 after a record holder has been moved or folded to a partially closed position.
Figure 14:
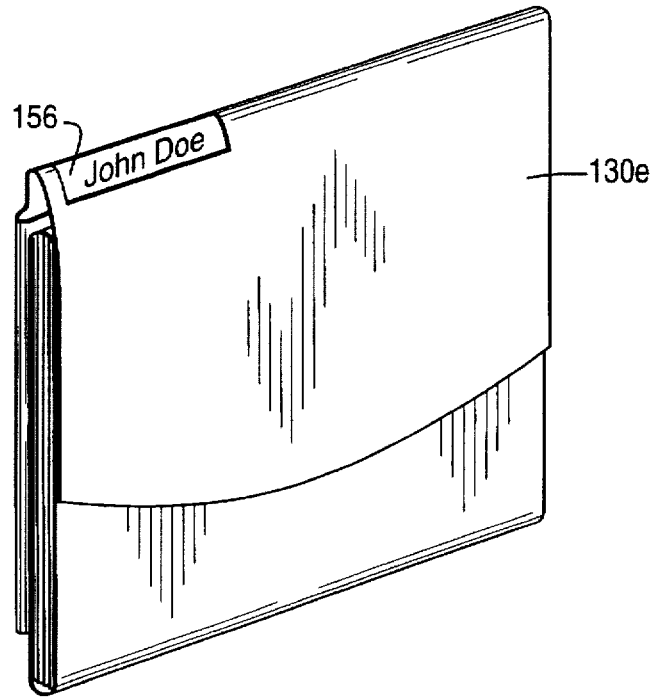
FIG. 14 is a view of the record management system after a cover has been folded to a closed position.

FIGS. 12–14 illustrate another embodiment of the invention comprising a file management system 120. The file management system 120 of this embodiment facilitates providing a set of records or plurality of record members, such as record members 122, 124, 126 and 128. In the embodiment being described, these record members 122, 124, 126 and 128 are permanently affixed to a folding member or cover 130 of the file management system 120. Although the plurality of record members 122–128 are shown permanently secured via staples 132 to the cover 130, it should be appreciated that the record members 122, 124, 126 and 128 could be detachably secured by using, for example, a perforation line or line of weakness 133, whereby one or more of the plurality of record members 122–128 may be torn off or separated from cover 130.

In the embodiment being described, the plurality of record members 122–128 may comprise various forms, such as employment application forms, government forms, employee/employer-related forms or any suitable forms or records which are used often in a small or large business. Notice that on each of the record members 122–128, a plurality of record areas is provided for recording employment information, such as employment date 122a employee name 122b and wage information 122c (FIG. 12).

As best illustrated in FIGS. 12 and 13, notice that the plurality of record members 122–128 may be folded across a fold line 142 from the position shown in FIG. 12 to the position shown in FIG. 13 after ends 134a and 136a have been secured together in the closed position shown in FIG. 13. In this regard, notice that the cover 130 comprises a storage section or area 144 comprising a pocket 146 (FIG. 13) which is defined by a pocket section 130c, a bottom section 130d and flaps 134 and 136. In this embodiment, the pocket 146 defines a storage area comprising dimensions of about 1"×10"×12".

The file management system 120 also comprises one or more flaps, such as flaps 134 and 136, which may be integrally formed as part of the cover 130 or which may be detachably secured or fastened thereto by suitable means such as VELCRO®, tape, adhesive or other suitable fastener for securing flaps 134 and 136 together. As best illustrated in FIG. 12, notice that an end 136a of flap 136 may be folded to the position shown in FIG. 12 and an end 134a of flap 134 may then be folded and secured thereto. Although not shown, it is contemplated by this invention that the file management system 120 may comprise a single flap which has one end secured to, for example, side 130a of cover 130, which traverses the entire width (indicated by double arrow W in FIG. 12), and which can be secured to a second side 130b in FIG. 12 by a suitable fastener, such as VELCRO®, adhesive, tape or the like (not shown).

It should also be appreciated that the two flaps 134 and 136 may be provided without any VELCRO® or adhesive and may comprise a plurality of mating slits 137 and 139 (FIG. 12) which cooperatively link or mate together to lock or secure flaps 134 and 136 together.

In this regard, this invention provides a system and method for organizing and storing nonpermanent record forms, such as record members 148 and 150 in pocket 146. At this point, a cover portion 130e of cover 130 may be folded in the direction of arrow 152 in FIG. 13, across a fold line 143 (FIG. 12), to the closed position shown in FIG. 14.

As best illustrated in FIGS. 12 and 13, the cover 130e comprises a notched out area 154 which facilitates revealing indicia 156 when the cover 130e has been moved to the closed position shown in FIG. 14.

When cover 130e is folded along a fold line 143, the cover 130e is situated in the closed position shown in FIG. 14. As best illustrated in FIG. 13, the file management system 120 may comprise a suitable VELCRO® fastener 158 and 160 which facilitates securing or locking the cover 130e in the closed position shown in FIG. 14. However, it should be appreciated that such fastener of securing means could comprise other suitable means for securing the cover in the closed position, such as a string, rope, rubber band, adhesive, metallic latch, clip or other suitable tie down.

Advantageously, this file management system 120 provides a record maintenance system for inventorying, maintaining and storing a permanent record set of forms (such as record members 122–128) and a nonpermanent set of record forms (such as record members 148 and 150). In this regard, the system 120 comprises the permanent record area 162 (FIG. 12) for maintaining and storing the permanent record set and a removable record area 162 defined by pocket 146 for removably storing the nonpermanent record set. Of course, it should be appreciated that if one or more of the permanent record members 122–128 were provided to be removable or detachable, then they could also be situated in the removable record area 164 after use.

Further, the system and method of the present invention provides means for storing a plurality of permanent and non-permanent records. In this regard, the most frequently used forms used by an employer with an employee, such as an employment application form, W-2 form and like, may be provided in the permanent record area 162. Non-permanent forms, such as annual employee appraisal forms, employee records, notes and the like, which are either non-permanent or unique to an individual employee, may be inventoried, stored or maintained in the non-permanent record area 164 (FIG. 13).

Also, this invention provides a system and method for inventorying, collecting and storing all forms associated with or necessary for a single employee, for example, into one portable and convenient storage area. This is particularly useful in employment environments where there is high employee turn over, such as in the restaurant or fast food business.

A process or method for managing the permanent record set and non-permanent record set will now be described.

Initially, the set of permanent records, such as the plurality of record members 122–128 are collected and secured to cover 130, as illustrated in FIG. 12. A non-permanent record set of a plurality of record members 148 and 150 may also be provided as part of the kit. After one or more of the permanent record members 122–128 and non-permanent record members 148 and 150 have been used, then the non-permanent record members 148 and 150 may be situated in the removable record area 164, after the flaps 134 and 136 have been moved to the closed position shown in FIG. 13. At this point, the plurality of permanent record members 122–128 may be folded across fold line 142 to the closed position shown in FIG. 13.

Thereafter, the cover 130e may be moved from the open position shown in FIG. 13 to the closed position shown in FIG. 14, thereby concealing and storing both the permanent and non-permanent record members.

After the file management system 120 is complete for a single employee, the system 120 may then be filed in a suitable storage location, such as a file drawer or file cabinet using the indicia 156. In this regard, the indicia may be an employee name, employee number or other suitable indicia or identifier.

In this embodiment, the width W (FIG. 12) is approximately 12 inches and the length L is approximately 27 inches, with a distance of about 9 inches between fold lines 142 and 143.

Advantageously, the system and method of the present invention provide a convenient form management kit providing suitable means for storing a plurality of record members 122–128 and a storage area 146 for storing a plurality of record members, such as members 148 and 150. This form management kit may conveniently be provided with all desired record member forms such that when, for example, a new employee is hired, all necessary forms for such employee are provided in one convenient kit, thereby making the supply, maintenance, management and subsequent storage of any used forms for that particular employee easy to handle and maintain.

Again, this system and method also facilitates collecting, inventorying and compiling any and all necessary forms prior to their use and ensuring that any forms necessary for a particular employee are provided, considered, subsequently completed and stored in a single convenient manner.

While the methods herein described, and the forms of apparatus for carrying these methods into effect, constitute preferred embodiments of this invention, it is to be understood that the invention is not limited to these precise methods and forms of apparatus, and that changes may be made in either without departing from the scope of the invention, which is defined in the appended claims.

What is claimed is:

1. A file management system comprising:
   a first panel;
   a second panel foldably coupled to said first panel;
   a third panel foldably coupled to said first panel;
   a plurality of predetermined record members detachably secured to said second panel; and
   at least one flap coupled to said first panel such that when said at least one flap and said second panel are folded from an open position to a closed position a pocket is defined for receiving said plurality of record member after they are detached from said second panel.

2. The file management system as recited in claim 1 wherein said plurality of predetermined record members are permanently secured to said cover.

3. The file management system as recited in claim 1 wherein said plurality of predetermined record members each comprise a plurality of record areas for recording employment information.

4. The file management system as recited in claim 1 wherein said second panel comprises a form section having said plurality of predetermined record members secured thereto;
   said third panel defining a cover which can be moved from an open position to a closed position to close said pocket.

5. The file management system as recited in claim 1 wherein said cover comprises a notched-out area which facilitates revealing indicia situated on said first panel.

6. The file management system as recited in claim 4 wherein said first panel comprises a first fold line and a second fold line; said first and second fold lines being situated such that when said second panel is folded across said first fold line and said third panel is folded across said second fold line, said plurality of record forms become covered.

7. A record maintenance system comprising:
   a foldable member foldably secured to a first panel;

a record set detachably secured to said foldable member;

a plurality of pocket flaps foldably secured to said first panel and being foldable from an open position to a closed position such that when said plurality of pocket flaps are in said closed position said foldable member may be moved to a second fold position, thereby defining a removable record area for receiving and storing said record set after they have been detachably removed from said removable member.

8. The record maintenance system as recited in claim 7 wherein said plurality of pocket flaps comprise a first flap secured to said first panel and a second flap secured to said first panel.

9. The record maintenance system as recited in claim 8 wherein said system further comprises:

a fastener for securing said first flap to said second flap.

10. The record maintenance system as recited in claim 9 wherein said system further comprises:

a second fastener situated on one of said plurality of flaps for securing said foldable member to said plurality of flaps.

11. The record maintenance system as recited in claim 7 wherein said first panel comprises at least one indicia associated therewith.

12. A method for managing a record set, said method comprising the steps of:

detachably situating said record set on an end panel of a folding member coupled to a central panel;

situating at least one flap on said central such that when said at least one flap and said record set are moved to a closed position, a pocket is defined for receiving said record set.

13. The method as recited in claim 12 wherein said method further comprises the step of:

folding said at least one flap to said closed position.

14. The method as recited in claim 12 wherein said at least one flap comprises a first flap and a second flap; said method comprising:

folding said first flap onto said second flap to define said pocket.

15. The method as recited in claim 12 wherein said method further comprises the step of:

detaching at least one record from said record set;

situating said at least one record into said pocket.

16. The method as recited in claim 15 wherein said method further comprises the step of:

folding said folding member such that said permanent record set and said pocket become concealed.

17. A form management kit comprising:

a center panel having a cover foldably secured thereto:

a folding member foldably coupled to said center panel and having a; at least one of a plurality of record forms detachably secured to said folding member;

said center panel comprising a plurality of flaps foldable along a plurality of fold lines such that when said plurality of flaps are folded along said plurality of fold lines and said folding member is folded to a closed position a pocket is defined for receiving and storing said at least one of said plurality of records forms.

18. The form management kit as recited in claim 17 wherein at least one of said plurality of is moveable from an open position to a closed position such that when said at least one of said plurality of flaps is in said closed position said flap cooperates with a wall on said folding member to define said pocket.

19. The form management kit as recited in claim 17 wherein said plurality of record forms comprise a plurality of employment forms.

20. The form management kit as recited in claim 17 wherein said folding member comprises a plurality of permanent forms secured thereto.

21. The form management kit as recited in claim 20 wherein said cover comprises an aperture for revealing an indicia situated on said center panel when said cover is in a closed position.

* * * * *